INVENTOR
ELIE CONDOLIOS

United States Patent Office 3,460,678
Patented Aug. 12, 1969

3,460,678
FLOCCULATION APPARATUS
Elie Condolios, Grenoble, France, assignor to Societe Grenobloise d'Etudes et d'Applications Hydrauliques (Sogreah), Grenoble, France, a corporation of France
Filed Apr. 21, 1967, Ser. No. 632,681
Claims priority, application France, Apr. 22, 1966, 4,924
Int. Cl. B01d 21/08; C02b 1/20
U.S. Cl. 210—219        4 Claims

ABSTRACT OF THE DISCLOSURE

This invention relates to a flocculator for a water treatment system and in which the floor thereof is maintained clear of deposit by rotating jets of water.

Water treatment systems frequently include a flocculator tank in advance of the settling tank for the suspended solids in the water being treated. Flocculation is usually accomplished by mixing a suitable reagent with the water in the flocculator with the aid of a rotating stirrer paddle which is operated so that it also keeps the flocculation tank floor more or less clear of the floc deposit tending to form there. For a satisfactory operation, the rotational movement of the paddle should be sufficiently rapid to keep the tank floor clear of deposit, while the stirring effect of the paddle should be sufficiently gentle to avoid destruction of the floc being formed. These two requirements have been found difficult to reconcile where the flocculator tank is large and in the operation of such tanks the art has had to put up with either inefficient flocculation, or deposit-formation on the bottom of the flocculation tank.

It is the primary bject of this invention to provide an improved arrangement which makes it possible in the use of large flocculator tanks, to satisfactorily attain the desired flocculation while at the same time preventing deposit-formation on the flocculation tank floor.

In accordance with the invention, a stirring paddle is utilized to mix the reagent with the water in order to bring about flocculation, and one or more spray arms rotating about a vertical axis and discharging jets of water are utilized to prevent formation of floc deposit on the floor of the tank.

Figure 1:
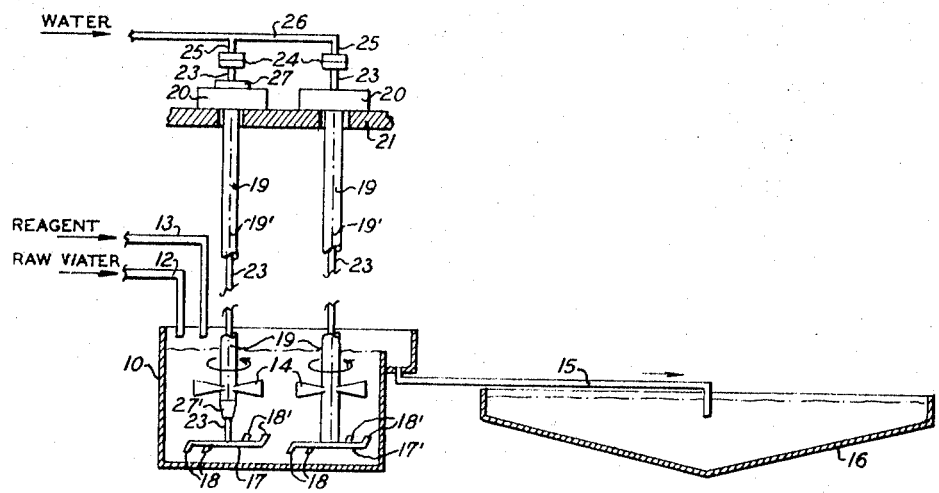
Figure 2:
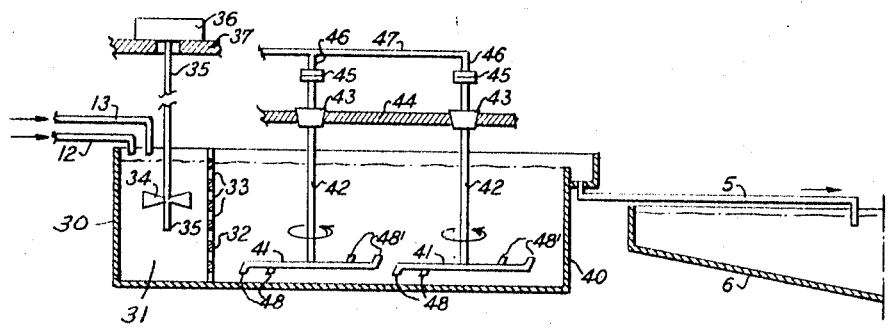

A better understanding of the invention as well as other objects and the advantages thereof will be obtained from the following description, when read in connection with the accompanying drawings in which FIG. 1 is a diagrammatic view of a conventional type water treatment system having a flocculator embodying the invention; and FIG. 2 is a similar view showing a flocculator provided with two compartments in accordance with the invention.

In FIG. 1 of the drawings, the numeral 10 designates a conventional flocculator tank into which the raw water to be treated enters through a pipe 12 and the reagent for producing flocculation is introduced through a pipe 13. The tank is a relatively large one and requires two stirring paddles 14, 14 for mixing the reagent from the pipe 13 with the raw water discharging from the pipe 12 in order to form the flocculant desired. The water discharging from the flocculator passes through a pipe 15 to a settling tank 16 of usual construction.

Each of the paddles 14 is mounted on a hollow, depending vertical drive shaft 19 which is connected in driven relation at its upper end to a suitable motor 20 mounted on a support 21. The stirring action of the paddles 14 must be gentle in order not to destroy the floc while it is forming. However, in a large flocculator such as shown in FIG. 1, if the paddles 14 are operated to provide such a stirring action, it has been found that the action of the paddles alone cannot be relied on to prevent the floc forming a deposit on the floor of the tank 10. To prevent this occurring, the flocculator in accordance with this invention, is provided near to or adjacently above the tank floor, with two spray arms 17, 17' each mounted to rotate about the central vertical axis 19' of an associated shaft 19. The spray arms 17, 17' are each provided with a plurality of nozzles 18, 18' which are movably mounted on the spray arms so that they may be adjusted for direction of the discharge of the jets of water therefrom.

The spray arms 17, 17' are each connected to a source for supplying water under a given pressure through a vertical pipe 23 connected at its lower end to the central part of such spray arm and extending up through its associated shaft 19 to a point above its associated motor 20. At its upper end each pipe 23 is revolvably connected by a suitable known type of coupling 24 to an outlet 25 in a supply pipe 26 connected to the source of water supply. The spray arms 17, 17' may be revolvably connected to their associated drive shafts so that their rotational movement caused by the reaction created by the jets of water discharged from its nozzles 18, 18' will not effect the driving action of the shafts 19 on the paddles 14. On the other hand, it is within the contemplation of the invention to connect the spray arms to the associated shafts 19 so that the reaction of the jets will assist the rotation of the paddles 14 and thereby reduce the driving motor power requirements of such paddles. Spray arm 17 is an example of a spray arm that is rotated independently of the paddles 14 and by the reaction of the jets. The pipe 23 to which spray arm 17 is connected may be revolvably supported by a bearing 27 mounted on its associated motor 20 and by a bearing 27' mounted on the lower end of its associated hollow shaft 19, as is well known in the art. Spray arm 17' is an example of a spray arm that is connected to its associated shaft 19 so that the reaction of the jets can supplement the power of the associated motor 20 in rotating the associated paddles 14. Spray arm 17' may be directly supported by the lower end of its associated shaft 19 as indicated in FIG. 1, or its associated feeder pipe 23 may be secured to such shaft 19 in any suitable manner.

It will be understood from the foregoing that the paddles 14 are rotated by their associated shafts 19 and motors 20 to intimately mix the reagent and water in a gentle fashion so as not to destroy the floc while it is forming. At the same time, the two spray arms 17, 17' are rotated due to the reaction of the jets of water discharging therefrom. Most of the nozzles on each spray arm are directed downwardly in the manner shown by the nozzles designated 18 on such spray arms, in order that the jets of water from such nozzles will sweep the flocculation tank floor in such manner as to put any floc which may have settled out on it back into suspension. The number of nozzles 18, the dimensions of such nozzles and the directions in which they are adjusted are so selected that all points on the flocculation tank floor will be successively swept by flows of water of sufficient velocity to put any solids which may have settled on such floor back into suspension. To attain this, it will be necessary also to match the discharge pressure of the jets to the tank size and the floc dimensions and specific gravity in each installation. This may be accomplished by having valve means associated with each nozzle as is well known in the art. The remaining nozzles 18' on the spray arms 17, 17' are preferably directed upwardly, as shown in FIG. 1 of the drawings, to produce a gentle stirring effect in the body of water in the tank 10 such as will be found necessary to dispose therethrough the lumps of floc swept up from the tank floor and to encourage flocculation. As in the case of the nozzles 18, the nozzles 18' will be selected and arranged on the spray arms 17, 17' to accomplish the results desired.

It has been found that in some cases efficient fluocculation may require that the raw water and the reagent remain in contact for a long time. In such situations it may be more preferable, in order to avoid the possibility of prematurely expelling part of the flow passing through the flocculator, to practice the invention by mixing the reagent with the water in one compartment, and utilizing the spray arms in a second compartment. An embodiment of the invention enabling this to be accomplished is shown in FIG. 2 of the drawings. In such embodiment the water and reagent fed into the flocculator tank 30 through the pipes 12 ad 13, respectively, are discharged thereby into a first relatively small compartment 31 formed by one end wall of the tank 30 and a partition 32 provided throughout its area with a multiplicity of small openings 33. The reagent and water are mixed together in the compartment 31 by a rotatable paddle 34 capable of producing the stirring action required to mix the water and reagent without the formation of deposit on the tank floor. This the paddle 34 is able to accomplish with a gentle stirring action because of the small dimensions of the compartment 31. The paddle 34 is mounted on the lower end of a vertical shaft 35 depending from a driving motor 36 mounted on a suitable support 37.

The water and reagent mixture produced in compartment 31 and in which flocculation has been initiated as a result of the mixture thereof by the paddle 34, passes from such compartment through the openings 33 in partition 32 and into a materially larger compartment 40. The mixture will remain in the larger compartment 40 for the length of time required to provide the prolonged contact between the water and reagent that is necessary to ensure complete flocculation. In order to prevent the formation of deposit on the floor of the large compartment 40, there are provided two spray arms 41, 41 similar to the spray arms 17, 17' shown in FIG. 1 of the drawings. The spray arms 41, 41 are provided at the lower ends of vertically disposed supply pipes 42, 42 rotatably supported by bearings 43, 43 in a manner known to the art on a support 44. The rotatable supply pipes 42, 42 are connected by suitable couplings 45, 45 to the outlets 46, 46 of a supply pipe 47 in a manner well known to the art. As in the manner of the nozzles 18 and 18' in the embodiment of FIG. 1, the nozzles 48, 48' of the spray arms 41, 41, the nozzle dimensions, the jet directions and pressures thereof are selected to ensure that the jets sweep the entire floor of the compartment so as to put any floc that may have settled out back into suspension in such manner that it will be properly dispersed throughout the water so as to encourage flocculation.

It will be understood, that while I have hereinabove described and illustrated in the drawings, embodiments which are especially advantageous for water treatment applications with a view to the elimination of dissolved or suspended solids, the invention is not to be confined to such applications, it being within the contemplation of this invention that embodiments of the same may be used also for the treatment of any liquid, or for the treatment of various forms of matter in suspension in a liquid.

I claim:

1. In a system for the treatment of liquids by flocculation, a flocculator tank, means for supplying to such tank the liquid to be treated and a reagent to be mixed with such liquid for the treatment thereof, and means in said tank for mixing the liquid and the reagent, and for preventing the formation of floc deposit on the tank floor, in such gentle manner as to avoid destruction of the floc being formed, said mixing means comprising a spray arm located adjacently above the tank floor, means for supporting said spray arm for rotational movement at such location about a vertical axis, means on said spray arm for discharging downwardly projecting jets of liquid which successively sweep such tank floor as said spray arm rotates to put back into suspension any solids which may have settled on said tank floor, and means for supplying liquid under pressure to said spray arm, said mixing means including a mixing paddle located in spaced relation above said spray arm, and means for rotating said paddle about said vertical axis at a given rotational speed, and in which said spray arm supporting means supports the same for rotational movement independent of said paddle, the necessary rotational movement being imparted to said spray arm by the reaction of the jets discharging therefrom.

2. In a system for the treatment of liquids by flocculation, a flocculator tank having a feed liquid entry side and a liquid discharge side and a flocculation zone between such sides, means at said entry side for supplying to such flocculation zone of said tank the liquid to be treated and a reagent to be mixed with such liquid for the treatment thereof, and means in said tank for mixing the liquid and the reagent, and for preventing the formation of floc deposit on the tank floor, in such gentle manner as to avoid destruction of the floc being formed, said mixing means comprising a spray arm located in said flocculation zone adjacently above the tank floor, means for supporting said spray arm for rotational movement at such location about a vertical axis, means on said spray arm for discharging downwardly projecting jets of liquid which successively sweep such tank floor as said spray arm rotates to put back into suspension any floc which may have settled on said tank floor, said spray arm being provided with a plurality of nozzles directed upwardly to cause the jets therefrom to disperse within the body of the liquid any solids put back into suspension, and means for supplying liquid under pressure to said discharging means on said spray arm.

3. In a system for the treatment of liquids by flocculation, a flocculator tank composed of two compartments separated by a perforated partition, means for supplying to such tank the liquid to be treated and a reagent to be mixed with such liquid for the treatment thereof, and means in said tank for mixing the liquid and the reagent, and for preventing the formation of floc deposit on the tank floor, in such gentle manner as to avoid destruction of the floc being formed, said mixing means comprising a spray arm located adjacently above the tank floor, means for supporting said spray arm for rotational movement at such location about a vertical axis, means on said spray arm for discharging downwardly projecting jets of liquid which successively sweep such tank floor as said spray arm rotates to put back into suspension any solids which may have settled on said tank floor and said mixing means including a mixing paddle located in one of said compartments and means for rotating said paddle, said spray arm being located in the other of said compartments, and means for supplying liquid under pressure to said spray arm.

4. In a system as defined in claim 3, in which said other compartment is materially larger than said one compartment, and in which said mixing means includes a plurality of said spray arms.

References Cited

UNITED STATES PATENTS

| | | | |
|---|---|---|---|
| 2,215,185 | 9/1940 | Lund | 210—319 X |
| 2,592,904 | 4/1952 | Jackson | 261—87 |

J. L. DE CESARE, Primary Examiner

U.S. Cl. X.R.

210—520; 261—88